United States Patent
Huang et al.

(10) Patent No.: US 9,544,613 B2
(45) Date of Patent: Jan. 10, 2017

(54) LOCAL DETECTION MODEL (LDM) FOR RECURSIVE MOTION ESTIMATION

(71) Applicant: Sony Corporation, Minato-ku (JP)

(72) Inventors: Chao Huang, Esslingen (DE); Oliver Erdler, Ostfildern (DE)

(73) Assignee: Sony Corporation, Tokyo (JP)

( * ) Notice: Subject to any disclaimer, the term of this patent is extended or adjusted under 35 U.S.C. 154(b) by 257 days.

(21) Appl. No.: 14/224,206

(22) Filed: Mar. 25, 2014

(65) Prior Publication Data
US 2014/0321559 A1 Oct. 30, 2014

(30) Foreign Application Priority Data
Apr. 24, 2013 (EP) .................................... 13165027

(51) Int. Cl.
| | | |
|---|---|---|
| H04N 19/14 | (2014.01) | |
| H04N 19/51 | (2014.01) | |
| H04N 5/14 | (2006.01) | |
| G06T 7/20 | (2006.01) | |
| H04N 19/172 | (2014.01) | |
| H04N 19/117 | (2014.01) | |
| H04N 19/192 | (2014.01) | |
| H04N 7/01 | (2006.01) | |

(52) U.S. Cl.
CPC ............. *H04N 19/51* (2014.11); *G06T 7/2013* (2013.01); *H04N 5/145* (2013.01); *G06T 2207/10016* (2013.01); *H04N 7/014* (2013.01); *H04N 7/0127* (2013.01); *H04N 19/117* (2014.11); *H04N 19/14* (2014.11); *H04N 19/172* (2014.11); *H04N 19/192* (2014.11)

(58) Field of Classification Search
CPC .................... G06T 2207/10016; G06T 7/2013; H04N 19/117; H04N 19/14; H04N 19/172; H04N 19/192; H04N 19/51; H04N 5/145; H04N 7/0127; H04N 7/014
USPC ...................................................... 375/240.29
See application file for complete search history.

(56) References Cited

U.S. PATENT DOCUMENTS

| | | | | |
|---|---|---|---|---|
| 5,646,867 A | * | 7/1997 | Ozcelik | H04N 19/503 375/240.14 |
| 2003/0006991 A1 | | 1/2003 | De Haan et al. | |
| 2004/0081239 A1 | * | 4/2004 | Patti | G06T 7/2013 375/240.16 |

(Continued)

FOREIGN PATENT DOCUMENTS

| | | |
|---|---|---|
| JP | 4393864 | 1/2010 |
| JP | 4813328 | 11/2011 |

OTHER PUBLICATIONS

H. Boujut et al. "Weighted-MSE based on Saliency map for assessing video quality of H. 264 video streams", 2011, 8 pages.

*Primary Examiner* — Shan Elahi
(74) *Attorney, Agent, or Firm* — Oblon, McClelland, Maier & Neustadt, L.L.P.

(57) ABSTRACT

The present disclosure relates to a method for improving an estimation process, comprising providing an image; detecting a failure area within said image to obtain a failure area map; obtaining a motion or disparity estimation map containing estimation vectors determined in an estimation process; providing a local direction model, LDM, map comprising LDM vectors determined on the basis of said estimated vectors and said detected failure area, and adjusting said estimation process dependent on the local direction model map.

18 Claims, 6 Drawing Sheets

(56) References Cited

U.S. PATENT DOCUMENTS

| | | | |
|---|---|---|---|
| 2004/0091049 A1* | 5/2004 | Yamaguchi | H04N 19/59 375/240.16 |
| 2005/0053154 A1* | 3/2005 | Yamaguchi | H04N 19/59 375/240.21 |
| 2005/0084016 A1* | 4/2005 | Yamaguchi | H04N 19/59 375/240.21 |
| 2007/0064807 A1* | 3/2007 | Paniconi | H04N 19/51 375/240.16 |
| 2007/0211307 A1 | 9/2007 | Uvarov | |
| 2007/0248260 A1* | 10/2007 | Pockett | H04N 13/0022 382/154 |
| 2008/0031327 A1* | 2/2008 | Wang | G06T 7/0069 375/240.12 |
| 2009/0022226 A1* | 1/2009 | Bang | H04N 19/51 375/240.16 |
| 2009/0135911 A1* | 5/2009 | Au | H04N 19/52 375/240.16 |
| 2010/0014588 A1* | 1/2010 | Nakazato | H04N 19/56 375/240.16 |
| 2010/0079605 A1* | 4/2010 | Wang | H04N 19/527 348/208.4 |
| 2010/0215104 A1* | 8/2010 | Osamoto | H04N 5/23254 375/240.16 |
| 2010/0254463 A1* | 10/2010 | Narroschke | H04N 19/147 375/240.29 |
| 2011/0090364 A1* | 4/2011 | Alvarez | H04N 19/176 348/222.1 |
| 2012/0099652 A1* | 4/2012 | Woods | H04N 19/647 375/240.16 |
| 2012/0219229 A1 | 8/2012 | Springer et al. | |
| 2012/0236934 A1* | 9/2012 | Chen | H04N 19/597 375/240.03 |
| 2013/0002907 A1* | 1/2013 | Alvarez | H04N 19/176 348/240.2 |
| 2013/0136371 A1* | 5/2013 | Ikai | G06T 5/001 382/224 |

* cited by examiner

LOCAL DETECTION MODEL (LDM) FOR RECURSIVE MOTION ESTIMATION

BACKGROUND

Field of the Disclosure

The present disclosure relates to a method for improving an estimation process, particularly a motion estimation process. The disclosure also relates to a device for providing an improved disparity or motion estimation map, as well as a computer program and a non-transitory computer-readable recording medium.

Description of Related Art

Estimation processes, like motion estimation or disparity estimation, are widely used in image-processing applications. In particular, frame rate up-conversion and the required image interpolation is based on motion estimation results. Some of the best motion estimation algorithms are based on recursive search block matching. The recursive estimation algorithm evaluates a set of candidate vectors which are derived from spatial or temporal predictor positions, which are partially modified based on particular schemes to allow for motion changes, by a matching criterion. However, these recursive search motion algorithms usually have problems with flat or low contrast image contents. One of the reasons is a so-called penalization system used in recursive search motion vector estimation algorithms. The penalization system is for example used to penalize local motion vector changes. The idea behind is that motion vectors inside an object within an image should have the same or at least similar motion vectors. Or in other words, objects are larger than blocks and objects have inertia. Therefore vectors should be similar among blocks in objects.

It has been recognized that such recursive search motion vector estimation algorithms using penalization systems have problems in gaining accurate estimation vectors for flat areas. For example it maybe that a large flat area is assigned with a constant motion vector instead of having a smooth gradient vector field with the result of annoying local judder artefacts in an interpolated image.

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly or impliedly admitted as prior art against the present invention.

SUMMARY

It is an object to provide a method which overcomes the above-mentioned disadvantages. Particularly, the method should provide improved or enhanced estimation vectors for flat areas. It is a further object to provide a device for providing an improved disparity or motion estimation map. Further it is also an object to provide a corresponding computer program for implementing the method and a non-transitory computer-readable recording medium for implementing the method.

According to an aspect there is provided a method for improving an estimation process comprising:
providing an image
detecting a failure area within said image to obtain a failure area map,
obtaining a motion or disparity estimation map containing estimation vectors determined in an estimation process,
providing a local direction model, LDM, map comprising LDM vectors determined on the basis of said estimated vectors and said detected failure area, and
adjusting said estimation process dependent on the local direction model map.

According to a further aspect there is provided a device for providing an improved disparity or motion estimation map comprising
a failure area detecting unit adapted to detect a failure area within an image and to provide a failure area map,
a motion or disparity estimation unit adapted to provide a motion or disparity estimation map containing estimation vectors determined in an estimation process,
a local direction model, LDM, unit adapted to provide a LDM map comprising LDM vectors determined on the basis of said estimated vectors and said detected failure area, and
an adjusting unit adapted to adjust the estimation process dependent on the local direction model map.

According to still further aspects a computer program comprising program means for causing a computer to carry out the steps of the method disclosed herein, when said computer program is carried out on a computer, is provided. Further, a non-transitory computer-readable recording medium that stores therein a computer program, which, when executed by a processor, causes the method disclosed herein to be performed is provided.

Preferred embodiments are defined in the dependent claims. It shall be understood that the claimed device, the claimed computer program and the claimed computer-readable recording medium have similar and/or identical preferred embodiments as the claimed method and as defined in the dependent claims.

One of the aspects of the present disclosure is to enhance the estimation process for failure areas by adapting/adjusting the estimation process in said failure areas of an image. In the present context, failure area means in general an area, which is prone to failure in the estimation process. At the same time the method guides the matching process within the estimation algorithm with a local direction model extracted from the last matching process to reduce noise in the motion vectors. In other words, the method first determines failure areas within an image and then adjusts the estimation process in accordance with a local direction model, LDM. The LDM can be based on the actual estimation result in case the estimation iterates on the same image pair, the last estimation which could be the case for device cost reasons or an aggregation of previous results which is done to achieve a more suitable characteristic, e.g. more stability. The local direction model reflects the motion vectors of a matching/estimation process only within the detected failure area. This local direction model is then applied as an indicator in the current matching process. The penalty values in the motion estimation process are adjusted such that the estimated vectors in the failure area have the same or similar direction as in the local direction model.

It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

In many image-based applications image processing is a necessary part for enhancing image quality. For example, to improve the dynamic resolution of video signals, frame rate up-conversion techniques are used as an element of image processing. The frame rate up-conversion technique is applied on input video content and the main part is to interpolate intermediate images between input frames.

An important part of frame rate up-conversion techniques is the so-called "motion vector estimation". In order to interpolate intermediate images correctly, the movement of objects between two frames should be known. Such movements are calculated by finding image correspondences, meaning to find the same image content in successive frames. This information called "motion vector" is calculated by a "motion estimation" algorithm. Some of the best motion estimation algorithms known in the art are based on recursive search block matching. The advantage of these algorithms is the low computational complexity and is therefore suitable for consumer market embedded devices with limited resources, like TV sets etc.

Figure 8:
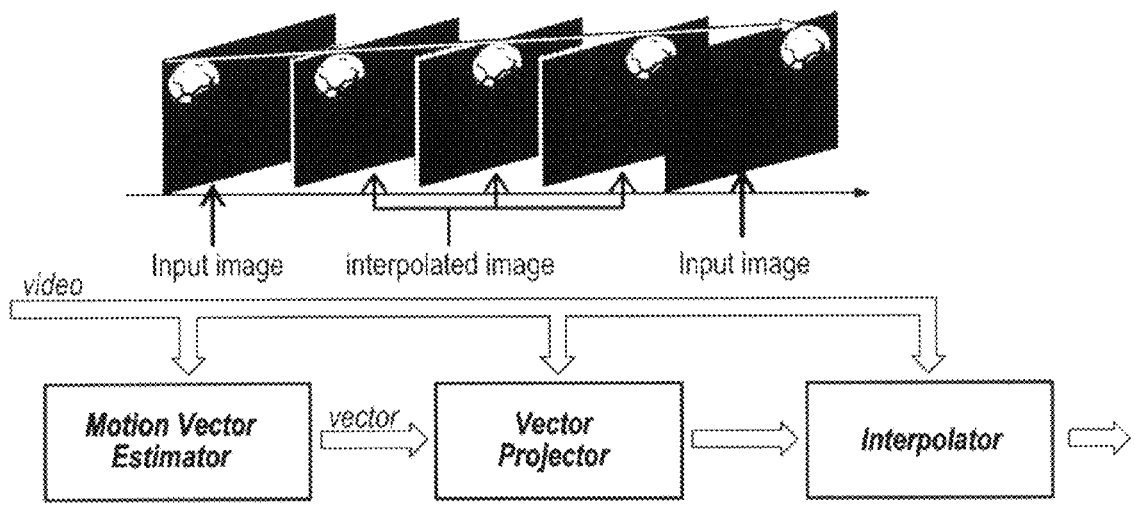
FIG. 8 shows the common concept of frame rate up-conversion.

In FIG. 8, a block diagram illustrates the process of frame rate up-conversion comprising the interpolation of intermediate or interpolated images. In the depicted images, an object, here a football, moves from the left upper corner to the right upper corner between two successive input images provided by a video source. Hence, the football moves in horizontal direction but not in vertical direction. In general, it is now a task of the interpolation process to interpolate positions of the football between the left upper corner and the right upper corner, as shown in FIG. 8.

Figure 9:
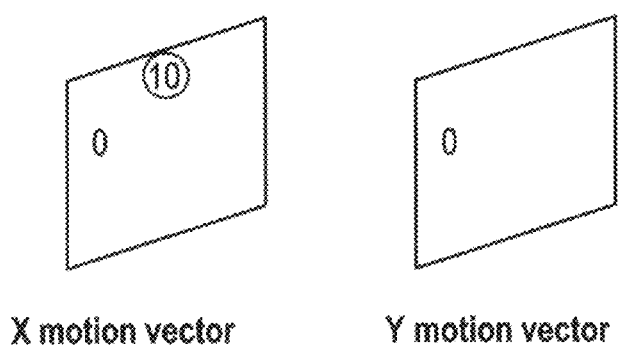
FIG. 9 shows X-motion and Y-motion vectors.

FIG. 9 shows the visualization of X- and Y-motion vectors of the example in FIG. 8. It can be seen that the background is more or less static and has no motion, so that the motion vector is zero on both X- and Y-direction. In FIG. 9 this is visualized with the grey value 0. As mentioned before, the football has a horizontal motion to the right with for example a velocity of 10 pixels per frame. Hence, the motion vector assigned to the object "football" is visualized with a brighter grey value of 10. In other words, the value 10 indicates that the difference of the position of the football between both input images is 10 pixels.

Figure 10:
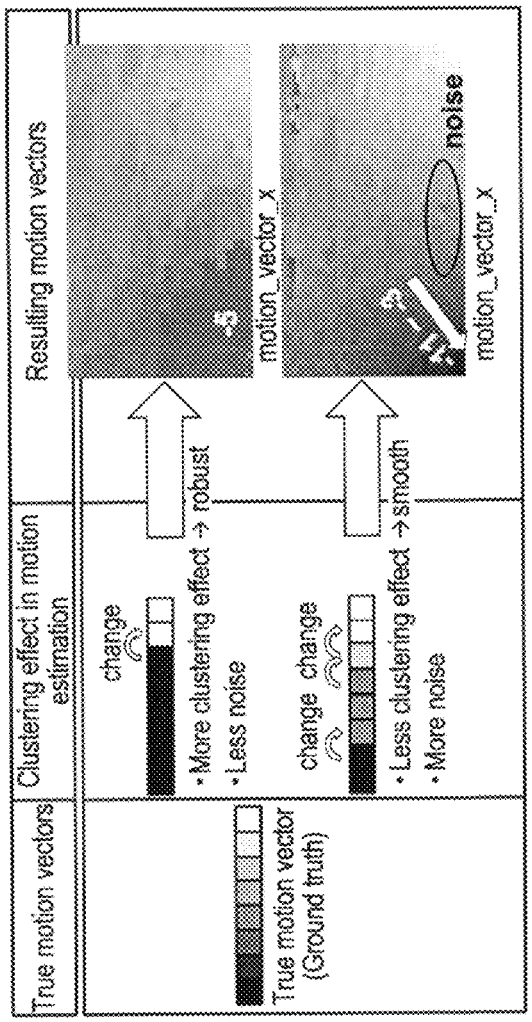
FIG. 10 illustrates the clustering effect in a motion estimation process.

Conventional known recursive search motion vector estimation algorithms usually have problems with flat (or low contrast) image contents. The motion vectors are not accurate in these areas. In recursive search motion estimation, the matching process (matching means finding corresponding blocks in two successive frames) tends to choose the motion vectors of the direct neighbours so that the motion vectors inside an object should have same or similar motion vectors. Local motion vector changes are then penalized by a pre-determined penalization system in order to make the estimation result more robust and stable, e.g. against spurious motion or noise. However, high penalization of motion vector change results in high clustering effects especially in flat areas, which may lead to annoying side effects. On the other side, low penalizations lead to more flexibility in motion tracking but also to a more instable and inhomogeneous vector field which again can result in side effects One of the main reasons of the inaccurate motion vectors is the clustering effect in the motion estimation process. As for example shown in the upper row of FIG. 10, if the clustering effect is relatively high, then more robust motion vectors can be achieved, which are less sensitive against image noise and/or local texture/lighting changes. But the disadvantage is that the motion vectors in a flat area are not accurate enough to describe the true motion. The straight-forward way of solving this problem is to set the penalization of motion vector changes and thus the clustering effect low enough, so that the estimator can catch the true motion in flat area. But this action also reduces the robustness of the motion estimation, and the motion vectors become noisy due to image noise and/or local texture/lighting changes, as shown in the lower row of FIG. 10.

Figure 11:
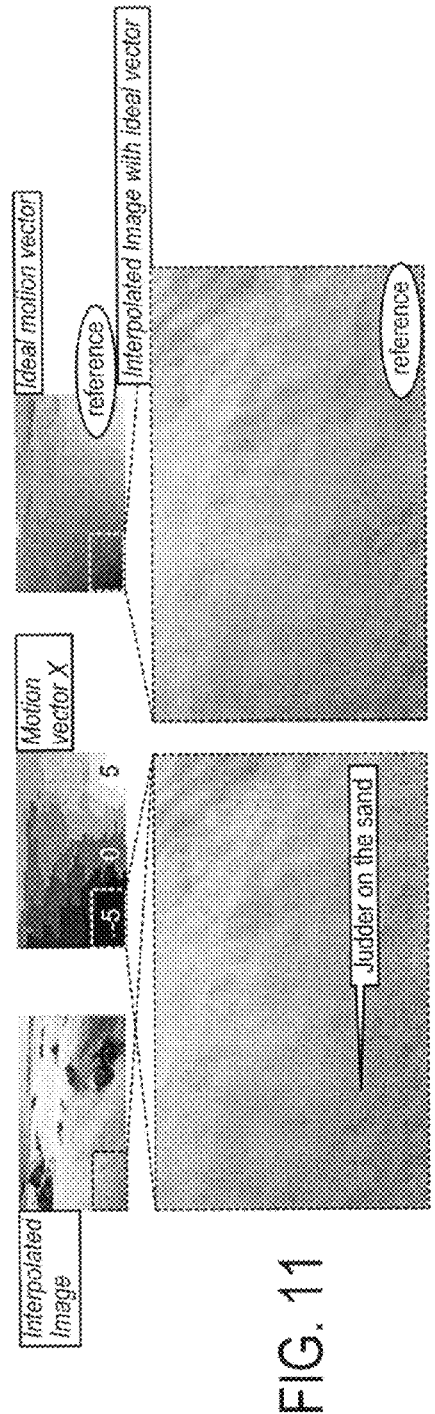
FIG. 11 illustrates judder artefacts in flat area in an interpolated image according to prior art motion estimation.

The consequence of inaccurate motion vectors is demonstrated in FIG. 11. In this scene, the camera is moving forward, image contents have different moving directions and speeds due to different distances to the camera. A smooth gradient structure in the motion vector fields is expected as shown in the "video motion vector image" on the right top of FIG. 11.

On the left lower corner, where the image content is flat, the matching penalties are relatively high so there is a strong clustering effect in the motion estimation process. That means instead of having a smooth gradient vector field, this large flat area has the same motion vector. And this generates the judder artefacts in the interpolated image. Although judder is a temporal effect and hence not relevant in still images, it might be an issue in the case of disparity estimation and view interpolation, because the effect will result in a wrong depth portrayal through wrong disparity vectors for flat areas. s.

To sum up, the conventional recursive search motion vector estimation algorithms using a penalization system have problems with flat or low contrast image content with the result of inaccurate motion vectors in these areas. The present disclosure now suggests an approach which overcomes these deficiencies and provides more accurate motion vectors for flat areas. This new approach is now described with reference to FIGS. 1 to 7.

Figure 1:
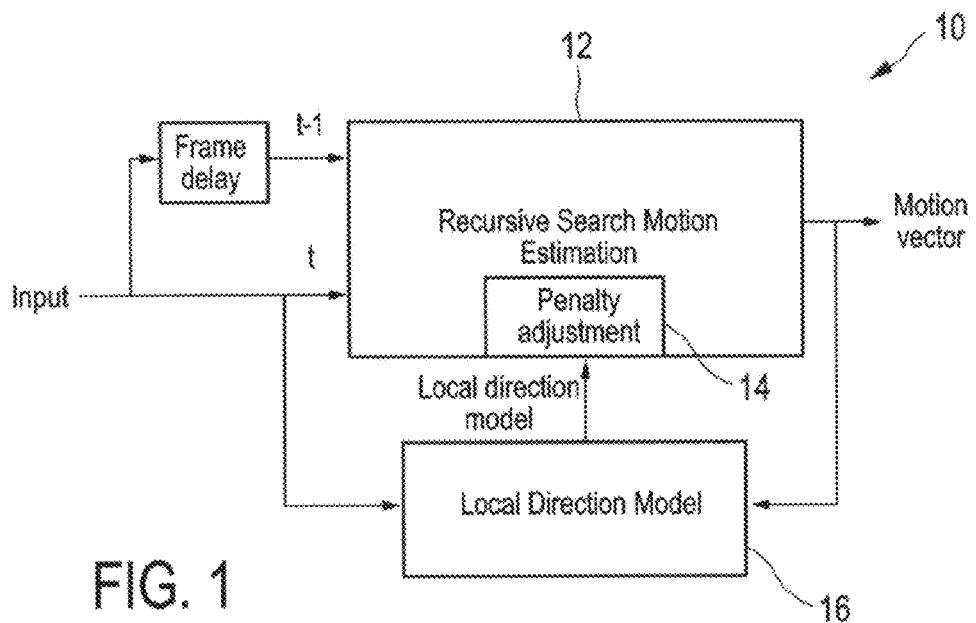
FIG. 1 shows a block diagram illustrating a preferred embodiment.

FIG. 1 shows a system block diagram of the proposed system and is designated with reference numeral 10. The system 10 comprises a recursive search motion estimation unit 12 which is supplied with two frames (of a video signal for example) of time t and t−1. The recursive search motion estimation unit 12 also comprises a penalty adjustment unit 14.

Further, the system 10 comprises a local direction model unit 16 which receives as input the frame of time t and the calculated motion estimation map output by the recursive search motion estimation unit 12. The local direction model unit 16 evaluates the inputs and provides a local direction model, preferably in form of a vector map to the penalty adjustment unit 14. The penalty adjustment unit 14 preferably adjusts certain penalty values in response to the supplied local direction model.

The system 10 is preferably implemented in an image processing circuit, wherein functions are realized in hardware, software or a combination of both. And such an image processing circuit can be built into multimedia devices like a TV set, a beamer, a tablet, a personal computer, a smartphone, etc.

The present approach, also called local direction model (LDM) approach, can be considered as an extension and optimization of a block-based recursive search motion estimator. In the current embodiment, the LDM acts as a "static input" to the system. In a hierarchical estimator, it could be applied also "in the loop" so working with actual vectors to improve the actual result in an iterative estimation scheme. As already mentioned above, the inputs of the local direction model unit are the current input luminance image frame im(t) and the motion vectors (motion estimation map) between last and current input image frame, including horizontal and vertical motion vector mvx(t−1) and mvy(t−1). The LDM approach delivers two local direction models, namely a horizontal and a vertical local direction model ldm_x and ldm_y, and both are used together as an indicator in the recursive search motion estimation.

The LDM approach works well under two conditions. First, the LDM approach is only applied on the flat area, where the motion estimator has the problem mentioned above. Second, it is assumed that the flat area has smooth motion which is in most of the cases true for normal video contents in film or TV programs. Under these two conditions, the main idea of the LDM approach is to reduce the matching penalties thus the clustering effect in flat area, and as the same time to guide the matching process with the local direction models extracted from the last matching process, to keep some stability, i.e. reducing noise in the motion vectors.

Figure 2:
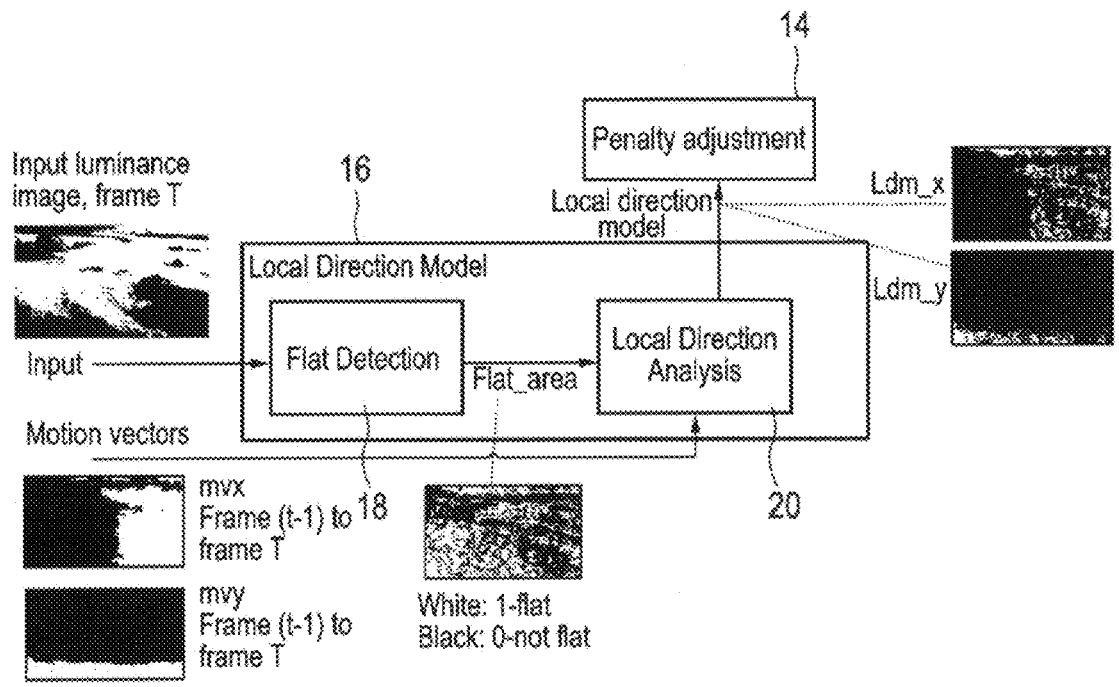
FIG. 2 is a block diagram illustrating the local direction model block of FIG. 1 in more detail.

Referring to FIG. 2, the local direction model unit 16 is described in more detail. This figure shows the top level block diagram of the proposed LDM algorithm implemented in the local direction model unit 16. The local direction model unit 16 comprises a flat detection unit 18 and a local direction analysis unit 20.

The flat detection unit 18 receives as input the current input image of time t. The flat area detection unit is required for detecting a flat area because only on flat areas the LDM algorithm is applied.

The second input of the local direction model unit are the motion vectors, i.e. the motion estimation map, of the last matching process. The motion vectors of the last matching process are supplied to the local direction analysis unit 20.

In the proposed algorithm, it is intended to extract local motion direction from the input and apply the extracted local direction models as an indicator in the current matching process run by the recursive search motion estimation unit 12. The "penalty adjustment" unit 14 is the final part of the LDM approach, where the matching penalties in motion estimator will be reduced and at the same time adjusted to have the similar direction as in the local direction models. In other words, the LDM algorithm only considers and evaluates flat areas and develops a direction model based on the motion estimation map of the last matching process.

Figure 3:
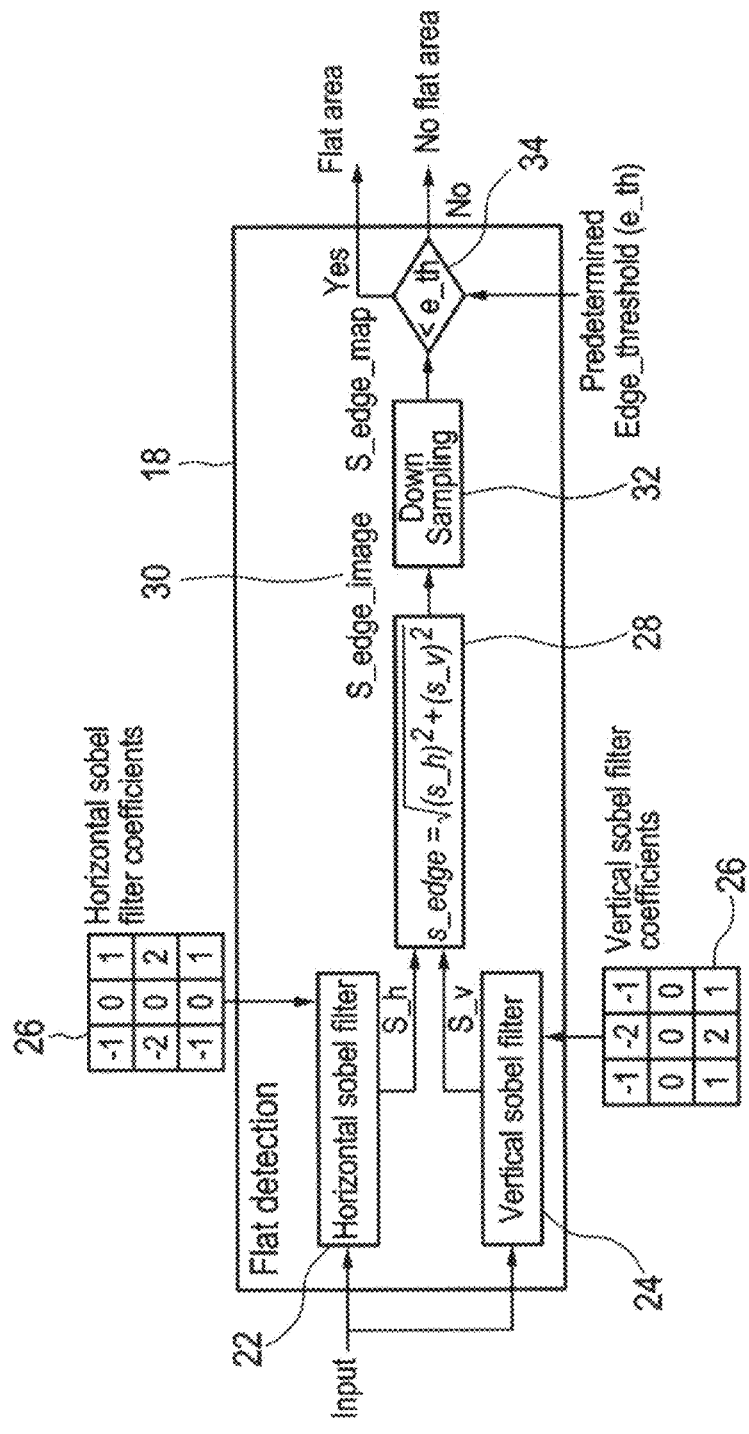
FIG. 3 is a block diagram for illustrating the flat area detection.

In FIG. 3, a preferred embodiment of a flat detection algorithm is shown. It is to be noted that other methods for detecting flat or low contrast areas in an image are also possible.

As shown in FIG. 3, the flat detection unit 18 comprises a horizontal sobel filter element 22 and a vertical sobel filter element 24, both being supplied with the current input image, preferably an input luminance image. The output of the filter elements 22, 24 each operating with a sobel filter coefficient array 26 is provided to a calculator element 28 which is adapted to combine the horizontally filtered and the vertically filtered image to a sobel edge image s_edge_image 30. The calculator element 28 operates on the basis of the following equation:

$$s\_edge\_image = \sqrt{(s\_h)^2 + (s\_v)^2}$$

wherein s_h is the output of the horizontal sobel filter element 22 and s_v is the output of the vertical sobel filter element 24.

The horizontal and vertical sobel filters 22, 24 and the calculator element 28 form a sobel edge detector.

The sobel edge image s_edge_image is then supplied to a down-sampling element 32. The down-sampling is required as to adapt the resolution of the flat detection, namely the resolution of the s_edge_image, to the same resolution of the motion vectors.

Here it is to be noted that the mentioned recursive search motion vector estimation algorithm is block-based meaning that the matching process is done blockwise and not pixelwise. If for example the block size is 16×16, then the down-sampling ratio is also 16 in horizontal and vertical direction. This means for example that if the s_edge_image has a HD resolution (1080×1920) before down-sampling, the output of the down-sampling element 32 has a resolution of 68×120. The output of the down-sampling element is called s_edge_map, being the down-sampled s_edge_image. Each point value in the sobel edge map (s_edge_map) represents a 16×16 block in the sobel edge image. The down-sampling can for example be done by using the following equation:

$$s\_edge\_map(x, y) = \frac{\sum_{X \in [x \times 16, (x+1) \times 16-1]} \left( \sum_{Y \in [y \times 16, (y+1) \times 16-1]} s\_edge\_image(X, Y) \right)}{16 \times 16}$$

Figure 4:
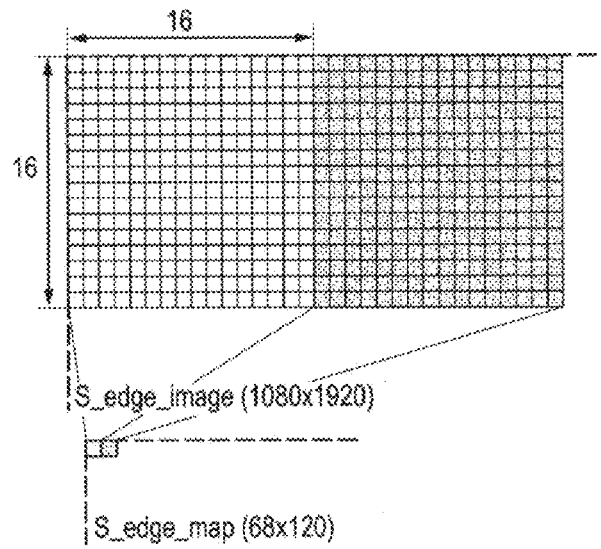
FIG. 4 is a block diagram for illustrating a down-sampling scheme.
Figure 5:
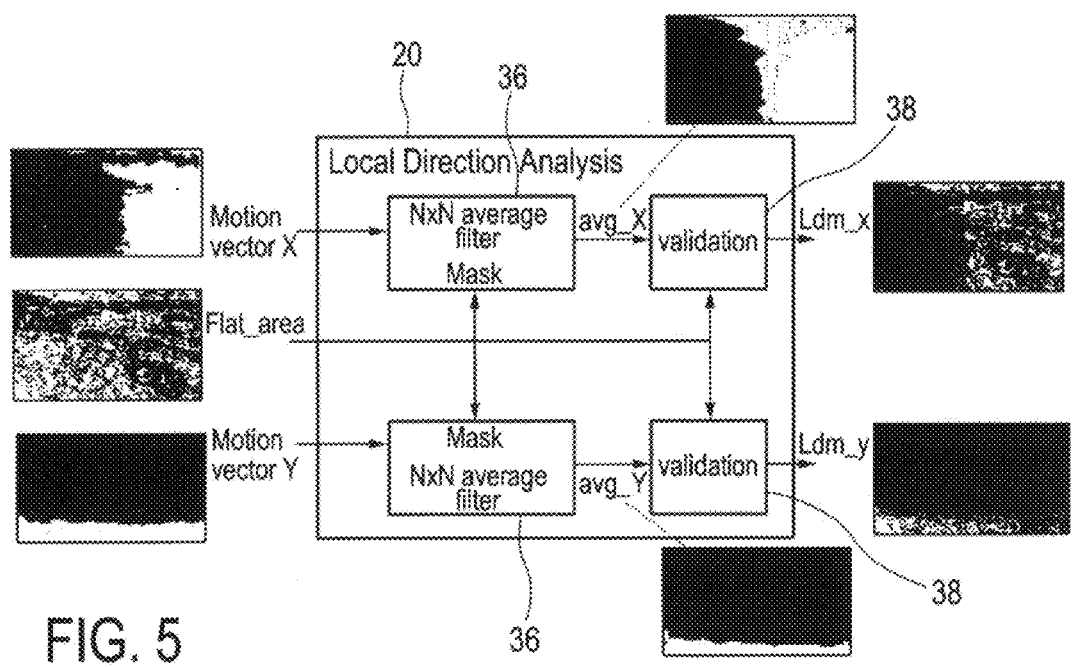
FIG. 5 is a block diagram illustrating a local direction analysis.

FIG. 4 schematically shows the down-sampling step, namely that a block of 16×16 pixel of the s_edge_image is down-sampled to one point in the s_edge_map.

The down-sampled sobel edge map s_edge_map is then supplied to a binarization element 34. Each point of the sobel edge map is compared with a predetermined threshold "e_th". If the respective edge value in the sobel edge map is smaller than the threshold, this point is detected as flat area, otherwise this point is not flat.

The result of the flat detection is a map of 68×120 values, each value representing a block of 16×16 pixel in the original input frame. A binary value of for example 0 represents a non-flat area, whereas a binary value of 1 represents a flat area.

Figure 6:
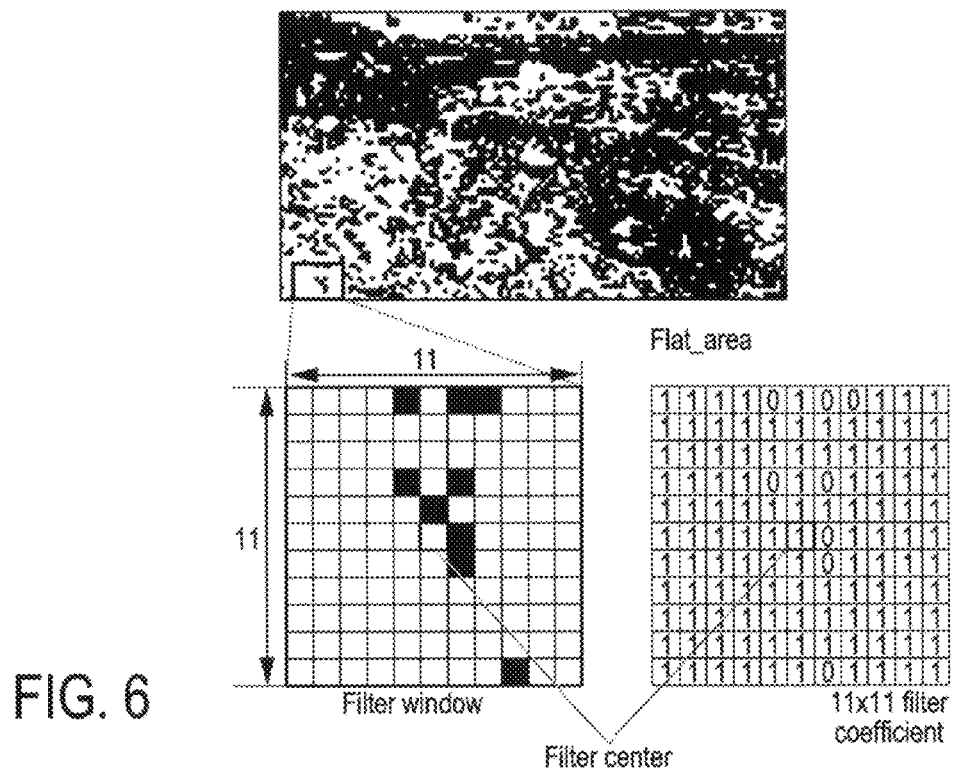
FIG. 6 illustrates filter coefficients according to flat area detection results.

The binarized flat_area map as a result of the flat detection is supplied to the local direction analysis unit 20. The local direction analysis unit is shown as block diagram in FIG. 5. The local direction analysis unit 20 comprises two similar "channels", one for the X-direction and the other for the Y-direction vectors. As shown, each channel comprises a N×N average filter element 36 and a validation element 38. The average filter elements are adapted to apply a mask N×N (preferably 11×11) average filter on the motion vectors, namely the X-direction motion vectors and the Y-direction motion vectors (mvx and mvy) representing a movement/a displacement of an object between the frame t−1 to the frame t, as shown in FIG. 2. Further, both filter elements 36 receive the flat area map as a mask. This means that the filter coefficients are dependent on the flat area detection result. If one position (X, Y) in the filter window is detected as flat area (the value of the flat area map is 1), the filter coefficient is 1 (coef(X, Y)=1). Otherwise the filter coefficient is 0 (coef(X, Y)=0), as shown in FIG. 6. The filtering can be expressed by the following equations:

$$\text{avg\_X}(x, y) = \frac{\sum_{X,Y \in filter\_window} (mvx(X, Y) \times coef(X, Y))}{\sum_{X,Y \in filter\_window} coef(X, Y)}$$

$$\text{avg\_Y}(x, y) = \frac{\sum_{X,Y \in filter\_window} (mvy(X, Y) \times coef(X, Y))}{\sum_{X,Y \in filter\_window} coef(X, Y)}$$

Where the filter window is defined as the N×N surrounding window of the current filter center.

In the next step, a validation on the average filtered motion vectors output by the respective average filter element 36 is applied because the local direction model should only be applied on flat areas. After the validation the local direction models are defined to be the average filtered motion vectors, when a point is detected as flat area. Otherwise, the local direction model is invalid and has a value, Inf, indicating the invalidity. The step of validation carried out by the validation elements 38 can be expressed by the following equations:

$$\text{ldm\_x}(x, y) = \begin{cases} \text{avg\_X}(x, y) \dots \text{if (flat\_area}(x, y) == 1) \\ -\inf \dots \text{otherwise} \end{cases}$$

$$\text{ldm\_y}(x, y) = \begin{cases} \text{avg\_Y}(x, y) \dots \text{if (flat\_area}(x, y) == 1) \\ -\text{Inf} \dots \text{otherwise} \end{cases}$$

The result of the validation and hence the output of the local direction analysis unit 20 are two maps, namely a local direction model map for the X-direction motion vectors, ldm_x, and a local direction model map for the Y-direction vectors, ldm_y. Each LDM map contains an average motion vector for each flat area block and an invalid value, Inf, for non-flat area blocks.

The result of the local direction analysis, namely the local direction models, ldm_x, ldm_y also contains information of flat detection and is supplied to the penalty adjustment unit 14 for use in the recursive search motion estimation process. The first step in using the local direction model result in the recursive search motion estimation is to reduce the matching penalty thus the clustering effect in the flat area. The matching penalties in recursive search motion estimation are defined to penalize local motion vector changes.

In a first embodiment, the matching penalties in the areas where ldm_x or ldm_y is valid (ldm_x, ldm_y # Inf) can be reduced by a predefined static factor, for example by a factor of 10, so that the new penalty equals the former penalty/10.

In a further embodiment, the penalty reduction method is to use a dynamic reduction factor λ which depends on the local image flatness. The local image flatness could be obtained from the flat detection if the sobel edge map s_edge_map is passed as output to the motion estimation process, then the flatness and λ can be derived from the sobel edge map s_edge_map with the following equation:

$$\text{flatness}(x, y) = \text{edge\_max} - \text{s\_edge\_map}(x, y)$$

$$\lambda(x, y) = 10 \times \frac{\text{flatness}(x, y)}{\text{edge\_max}}$$

Where edge_max is the predefined maximum sobel edge value, the default value being 255 for 8 bit images. The penalty reduction can be done with the following equation $$\text{penalty} = \frac{\text{penalty}}{\lambda(x, y)}$$

Then in a next step, the local direction models, ldm_x, ldm_y, can be used as an indicator in the recursive search motion estimation process to reduce vector noise caused by lower clustering effect. The preferred embodiment is to derive a multiplication factor for each matching vector, also called matching candidates, which depends on the 2D distance between matching vector and LDM.

Figure 7:
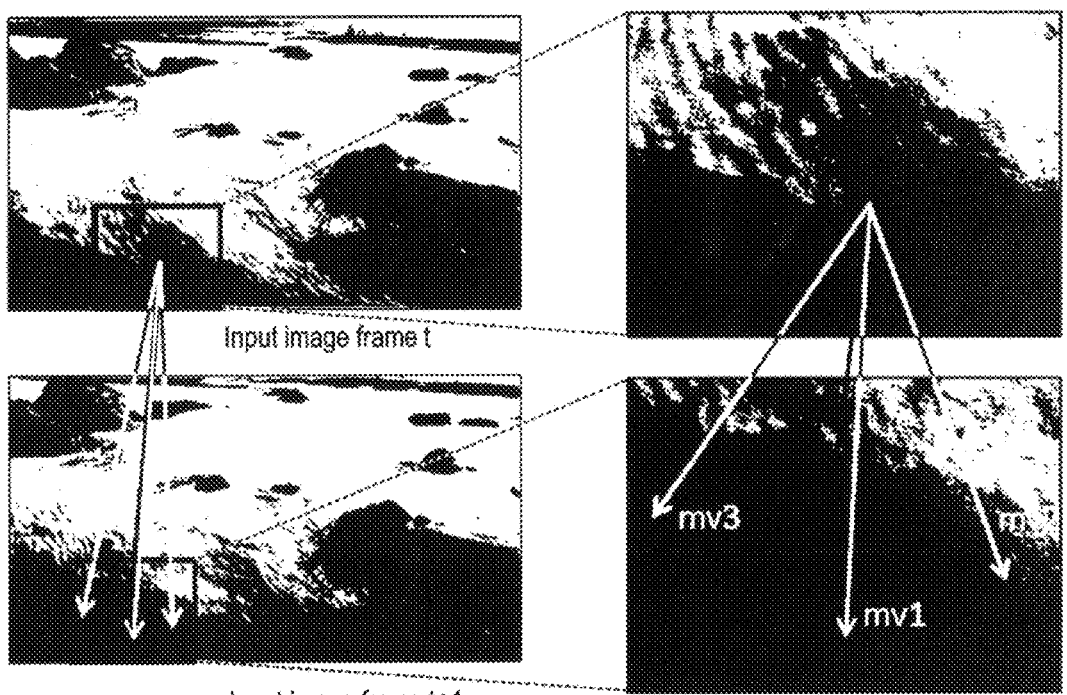
FIG. 7 shows matching candidates and a local direction model vector.

FIG. 7 illustrates the relation between matching candidates and local direction model.

In FIG. 7, three matching candidates, mv1, mv2 and mv3 and an LDM vector are shown, each of them consists of one x and y component, which in case of motion vectors are mvx_i and mvy_i, i being the running index of matching candidates from 1 to 3 in the shown example. LDM means in this case ldm_x and ldm_y.

With the following equation it is possible to indicate the matching process the preferred direction from LDM by adjusting the matching penalties:

$$\text{penalty\_i} = \alpha \times \text{penalty\_i} \times \sqrt{(mvx\_i - ldm\_x)^2 + (mvy\_i - ldm\_y)^2}$$

Where α is a predetermined scalar factor (default 0.5), and the term $$\sqrt{(mvx\_i - ldm\_x)^2 + (mvy\_i - ldm\_y)^2}$$

is the 2D distance between matching candidates (mvx_i, mvy_i) and the local direction model (ldm_x, ldm_y). In this way, the matching candidates which point far away from the local direction model are more strongly penalized then the matching candidates pointing near to the local direction model. And the matching process is then "guided" to prefer the matching candidates near to the ldm vector.

The use of a local direction model as mentioned above allows to optimize the performance of motion estimation for flat image areas with smooth motion. Particularly, the local direction model has been adapted to extract motion vector direction information from previous motion vectors and the flat detection results.

It is to be noted that the embodiment described above is not only useable for flat areas but instead more general also for failure areas. A failure area is an area in an image which is prone to failure in the estimation process, e.g. matching process. A flat area is merely one example of such an area prone to failure.

It is to be understood that the present approach described above for motion estimation may also be used for disparity estimation, since both estimation processes are based on block matching techniques.

Obviously, numerous modifications and variations of the present disclosure are possible in light of the above teachings. It is therefore to be understood that within the scope of the appended claims, the invention may be practiced otherwise than as specifically described herein.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

In so far as embodiments of the invention have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present invention. Further, such a software may also be distributed in other forms, such as via the Internet or other wired or wireless telecommunication systems.

A circuit, like the image processing circuit, is a structural assemblage of electronic components including conventional circuit elements, integrated circuits including application specific integrated circuits, standard integrated circuits, application specific standard products, and field programmable gate arrays. Further a circuit includes central processing units, graphics processing units, and microprocessors which are programmed or configured according to software code. A circuit does not include pure software, although a circuit includes the above-described hardware executing software.

The present application claims priority to European patent application 13165027.7, filed in the European Patent Office on Apr. 24, 2013 the entire contents of which being incorporated herein by reference.

The invention claimed is:

1. A method for improving an estimation process on a device having a processor and a memory, comprising:
   providing an image, using the processor,
   detecting a failure area within said image to obtain a failure area map, the failure area being an area that is prone to failure in the estimation process, using the processor,
   obtaining a motion or disparity estimation map and determining, in the motion or disparity estimation map, estimation vectors in the estimation process, using the processor,
   providing a local direction model (LDM) map comprising LDM vectors determined on the basis of said estimated vectors and said detected failure area, using the processor,
   adjusting said estimation process dependent on the local direction model map, using the processor, and
   controlling a display to display an interpolated image produced by the estimation process, using the processor.

2. The method of claim 1, wherein
   said failure area is a flat area within said image,
   a penalty system with penalty values is used in the estimation process, and
   said adjusting said estimation process comprises adjusting said penalty values dependent on the local direction model map.

3. The method of claim 2, wherein providing a local direction model map comprises:
   average filtering said estimation map.

4. The method of claim 3, wherein average filtering comprises:
   applying a masked N×N average filter on the estimation map using said failure area map as mask.

5. The method of claim 4, wherein masking said filtered map comprises:
   setting a filter coefficient to 1 in the detected failure area, and
   setting said filter coefficient to 0 in the remaining area.

6. The method of claim 5, comprising:
   validating said average filtered map on the basis of the failure area map.

7. The method of claim 6, wherein validating said average filtered map comprises:
   masking said average filtered map by said failure area map, so that the values in the map belonging to a failure area remain unchanged indicating a valid area and the values in the map belonging to the non-failure area are set to a predetermined value indicating a non-valid area.

8. The method of claim 2, wherein detecting a flat area comprises:
   applying a sobel edge detection on the image.

9. The method of claim 8, further comprising:
   filtering said image using horizontal and vertical sobel filters, and
   combining both filtered images to obtain a sobel edge image.

10. The method of claim 9, comprising:
    down-sampling said sobel edge image to provide a sobel edge map.

11. The method of claim 10, comprising:
    binarizing said sobel edge map.

12. The method of claim 11, wherein binarizing comprises:
    comparing each value of said sobel edge map with a predetermined threshold value,
    setting a respective value in the failure area map to a first value or a second value dependent on the comparison.

13. The method of claim 2, wherein adjusting said penalty values comprises reducing said penalty values by a predetermined factor.

14. The method of claim 10, wherein adjusting said penalty values comprises:
    calculating said penalty values on the basis of said sobel edge map.

15. The method of claim 2, wherein said estimation process considers a distance between an estimated vector and the respective vector in the local direction model map.

16. A device for providing an improved disparity or motion estimation map, comprising:
    a processor; and
    a memory storing code that, when executed by the processor, controls the processor to
    detect a failure area within an image and to provide a failure area map, the failure area being an area that is prone to failure in an estimation process, obtain a motion or disparity estimation map and determine in the motion or disparity estimation map, estimation vectors in the estimation process, provide a local detection model (LDM) map comprising LDM vectors determined on the basis of said estimated vectors and said detected failure area, adjust the estimation process dependent on the local direction model map, and control a display to display an interpolated image produced by the estimation process.

17. The device of claim 16, wherein the code comprises code to control the processor to detect a flat area as the failure area within said image and to provide the flat area map, use a penalty system with penalty values, and adjust said penalty values dependent on the local direction model map.

18. A non-transitory computer-readable recording medium that stores therein a computer program product, which, when executed by a processor, causes the processor to detect a failure area within an image and to provide a failure area map, the failure area being an area that is prone to failure in an estimation process, obtain a motion or disparity estimation map and determine, in the motion or disparity estimation map, estimation vectors in the estimation process, provide a local detection model (LDM) map comprising LDM vectors determined on the basis of said estimated vectors and said detected failure area, adjust the estimation process dependent on the local direction model map, and control a display to display an interpolated image produced by the estimation process.

* * * * *